J. M. CLARK.
TWINE CUTTER.
No. 62,528. Patented Mar. 5, 1867.
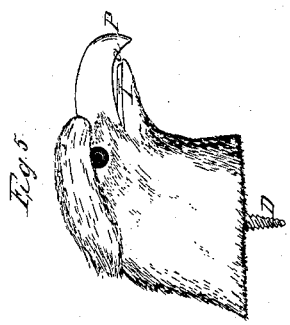
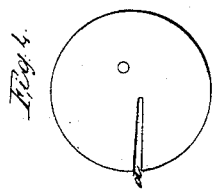
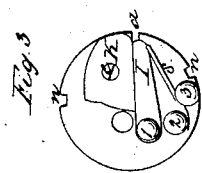
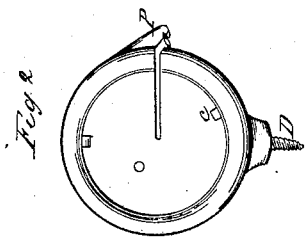
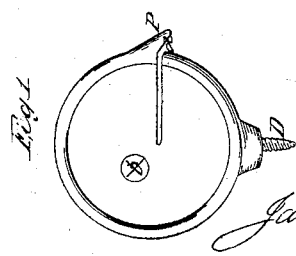

United States Patent Office.

JAMES MADISON CLARK, OF CHESTER, CONNECTICUT.

Letters Patent No. 62,528, dated March 5, 1867.

---

IMPROVED TWINE-CUTTER.

---

The Schedule referred to in these Letters Patent and making part of the same.

---

TO ALL WHOM IT MAY CONCERN:

Be it known that I, JAMES MADISON CLARK, of Chester, in the county of Middlesex, in the State of Connecticut, have invented a new and improved Twine-Cutter; and I do hereby declare that the following is a full and exact description thereof, which will enable others skilled in the art to make and use the same, reference being had to the accompanying drawings, and to the letters and figures of reference marked thereon.

The nature of my invention consists in constructing a case, and providing it with a knife which operates against wood, or its equivalent, by means of a spring or weight, for the purpose of cutting twine and other cord.

Figure 1, of the accompanying drawing, is a representation of one of my twine-cutters, having a case made of cast iron, with a slot or opening to receive the twine, as shown at $a$, a projection, P, to guide the twine to the opening, and a screw, D, to attach it to a counter.

Figure 2 is an inside view of the case, representing two guides at $c$ $c$, which direct the plate to which the cutting arrangement is attached.

Figure 3 represents a plate fitted to the inside of the case.

It has an opening, $a$, which corresponds to the opening in the case, on the upper side of which a knife, K, is represented secured by the screw $e$. A strip of wood, which I call a tongue, is represented at I, pivoted to the plate by pin 1, and pressed against the edge of the knife by a spring, shown at S. The point of the knife is turned upward above, and the end of the tongue downward below the opening, to allow the twine to enter between them. The spring is attached to the plate by pin 2, and braced by pin 3, around which it is wound to give it greater elasticity. When the plate with its cutting arrangement is put into the case, the guides $c$ $c$ enter the slots in the plate, represented at $n$ $n$, and direct it to its proper position, and the cover, represented by Figure 4, is put on, and the whole secured together by the screw $b$, as shown in fig. 1.

My twine-cutter is intended to be attached to the upper side of a counter, which is easily done by the screw D. The projection P and opening $a$ unerringly guide the twine between the knife K and tongue I, where, by the yielding pressure of the tongue, operated by the spring S, it is severed by a drawing stroke along the edge of the knife, which is so encased that no accident can happen from it to the operator. It may be constructed to combine the ornamental with the useful in a variety of ways, one of which is illustrated by Figure 5. It is not essential that the knife should be stationary, as either it or the tongue, or both, may be pivoted so as to be operated by the spring.

What I claim as my invention, and desire to secure by Letters Patent, is—

The knife K, in combination with the tongue I and spring S, for the purpose herein set forth.

JAMES MADISON CLARK.

Witnesses:
T. C. SILLIMAN,
SOCRATES DENISON.